Dec. 25, 1928.
R. C. MATHES
1,696,315
WAVE TRANSMISSION SYSTEM
Original Filed Nov. 1, 1924
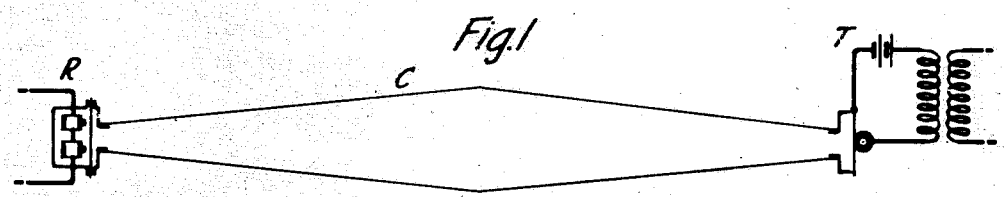
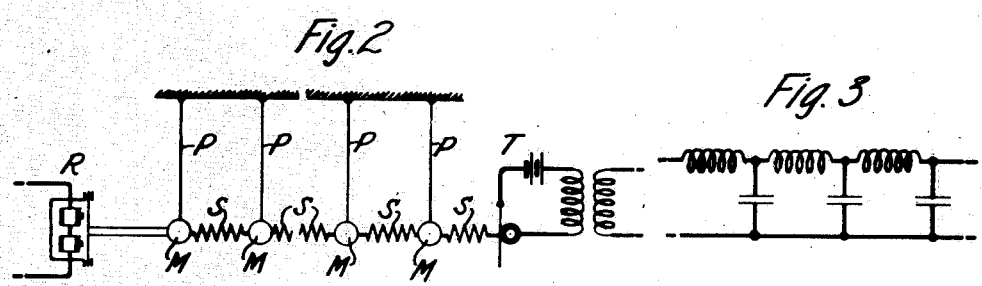
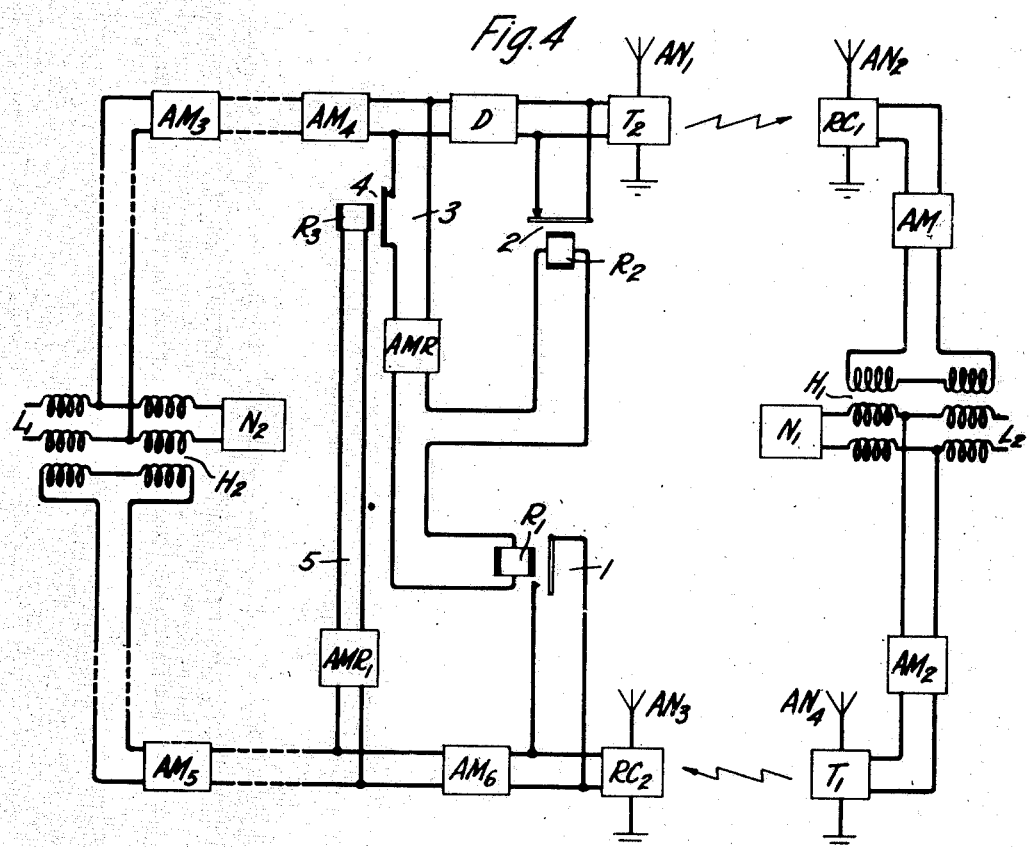
Inventor:
Robert C. Mathes,
by
Attorney Patented Dec. 25, 1928.

1,696,315

UNITED STATES PATENT OFFICE.

ROBERT C. MATHES, OF WYOMING, NEW JERSEY, ASSIGNOR TO WESTERN ELECTRIC COMPANY, INCORPORATED, OF NEW YORK, N. Y., A CORPORATION OF NEW YORK.

WAVE TRANSMISSION SYSTEM.

Original application filed November 1, 1924, Serial No. 747,164. Divided and this application filed December 16, 1926. Serial No. 155,155.

This invention relates to wave transmission systems and particularly to systems requiring delayed wave transmission for their proper functioning and is a division of patent application Serial No. 747,164, filed November 1, 1924.

An object of this invention is the improvement of transmission systems utilizing delay circuits or networks.

In transmission systems of the type referred to, such as voice operated repeater circuits and echo suppressing arrangements, it has been found advantageous to provide a delay in the transmission of the waves during the time required for the relays or other circuit controlling devices to operate. Heretofore, such a delay has been obtained by the use of electrical networks, such as filters or artificial loaded lines.

In accordance with this invention a mechanical transmitting means is provided having mass and elasticity so proportioned as to obtain a required time delay.

In one embodiment of the invention a mechanical transmission path of distributed constants, preferably an acoustical system is employed in an electrical circuit for obtaining a required time delay, the electrical waves being converted into acoustical waves at one end of this system and the acoustical waves being converted into electrical waves at the other.

It has been found that in most electrical systems where any considerable delay is required the cost of a mechanical delay system including the arrangements for converting the electrical waves to mechanical waves and back to electrical waves is considerably less than the cost of an electrical network, since the ordinary type of electrical network requires a large number of sections which are expensive to construct.

Delay systems are defined sufficiently by the statement of their function. They must delay the transmission of waves by a required amount and in so doing must not have any other effect or at least no detrimental effect on the transmitted waves, although particular designs of delay circuits may, for example, be used to give a delay which is different for the different frequencies in a transmitted band to compensate a delay characteristic already present in the transmission. Such a delay circuit is disclosed and claimed in application of Silent, Serial No. 64,882, filed October 24, 1925. A time delay is fundamentally different from a mere phase shift in that the time of delay is large compared to the period of the waves transmitted.

The characteristics of wave motion are analogous in mechanical and electrical systems so that the fundamental mechanical and electrical equations are identical except for the symbols employed. The corresponding quantities in the two systems are:

| Mechanical systems. | Electrical systems. |
|---|---|
| Force. | Electromotive force. |
| Displacement. | Charge. |
| Velocity of vibration. | Current. |
| Mass. | Inductance. |
| Stiffness or elasticity. | Reciprocal of capacity. |
| Friction. | Resistance. |

The transmission characteristic of any system for the propagation of wave energy is measured in terms of the propagation constant P. In an electrical system the propagation constant per unit length of a uniform line, or per section of a line of recurrent structure is defined as the natural logarithm of the vector ratio of the steady state currents at two points separated by a unit length in a uniform line of infinite length or at two successive corresponding points in a line of recurrent structure of infinite length, that is, $$P = \log_e \frac{I_1}{I_2}$$

where $I_1$ is the input current and $I_2$ the output current. This definition and expressionn also hold true for mechanical systems where $I_1$ and $I_2$ represent the mechanical currents (velocities of vibration).

The propagation constant is composed of two components $(P = A + jB)$. The real part A is called the attenuation constant and the imaginary part B is called the phase or wave length constant, i. e., the retardation angle in radians. The velocity (V) of the propagation of a wave of angular velocity ($\omega$) is $$V = \frac{\omega}{B}$$

and the time of transmission or delay ($t$) per unit length or per section is $$t = \frac{B}{\omega}.$$

This invention can be more readily understood by reference to the following detailed description in connection with the drawing in which Fig. 1 shows an acoustical delay system according to this invention, Fig. 2 shows a mechanical system of lumped constants, Fig. 3 shows an electrical system equivalent to the mechanical system of Fig. 2, and Fig. 4 shows a four-wire combined land line and radio system to which this invention is applicable.

Referring to Fig. 1 which shows an acoustical delay circuit, incoming electrical waves are converted into acoustical waves by means of the electromagnetic receiver R and the delayed mechanical waves reconverted into electrical waves by means of the transmitter T. Intermediate transmission is by means of acoustic waves directed and regulated by the sound conduit C in accordance with conventional practice in the construction of the horn elements in acoustic transmitters and receivers. The delay in this type of transmitting medium is inherent in the material of the medium, although if the elements of this medium were reduced to molecular dimensions it would be obvious that the conditions inherent in the operation of a system employing lumped constants, as shown in Fig. 2, are closely paralleled. In common in the two types of systems, transmission is effected by wave motion, the velocity of propagation being determined by the mass (or density) and the stiffness (or elasticity) characteristics of the medium. In the arrangement of Fig. 1 the desired delay is regulated solely by varying the length of the path since the characteristics of the medium are fixed.

The design of this type of system is parallel to that of an electrical line in which there is no leakage. If the attenuation due to friction is small the delay may be determined as though the waves were propagated in a dissipationless (free) medium. However, if this attenuation is large the velocity of propagation will be considerably lower and may to some extent depend upon the frequency of the transmitted waves.

Fig. 2 illustrates a type of mechanical delay circuit employing lumped constants. This system is analogous to the electrical system of Fig. 3, the mass of elements M and the stiffness of elements S being analogous, respectively, to the inductance of the coils and the capacity of the condensers of Fig. 4. The design data pertaining to electrical delay circuits of this type, as discussed in an article entitled "Physical theory of the electrical wave filter" by G. A. Campbell, in the Bell System Technical Journal for November, 1922, are equally applicable to the mechanical delay circuit of Fig. 2, having regard for the differences in units and conversion factors. For ideal conditions simulating those existing in an electrical filter circuit made up of lumped inductances and capacities each of which is completely individual in its function, the masses must be assumed to be perfectly rigid, the stiffness elements, springs, for example must be assumed to have no weight, and pendant means P must be assumed to be perfectly flexible. Conversion from electrical to mechanical energy and back to electrical energy is accomplished by means of the receiver element R and the transmitter element T, as in the system of Fig. 1. The first mass element at the left is driven by the receiver diaphragm. In a manner entirely analogous to the operation of the end section of the network of Fig. 3, the energy is absorbed in actuating the mass into movement. After an interval determined by the time constant of the first section, comprising a mass and a stiffness element, this energy will have been stored in the mass and then expended in storing up an equivalent amount of energy in the first stiffness element. This stiffness element, the first spring, in turn discharges this energy into the second mass element, and so on throughout the transmission path. It is substantially immaterial so far as the physical principle is concerned whether the mechanical energy transfers occur in the single plane including the several pendant means, or in planes transverse thereto. The number of sections, in a practical case, would be many times as great as that shown.

Fig. 4 shows an electrical system in which the delay circuit of this invention may be advantageously employed. Referring to this figure, $L_1$ and $L_2$ indicate low frequency lines connected, for example, to central telephone exchanges. In the particular circuit that will be assumed for convenience, $L_1$ is connected to a central station in New York city and $L_2$ to a central station in London. The circuits between these lines are adapted to transmit signals in both directions over individual paths, partly by wire and partly by radio. The radio link comprises the portions between antennæ $AN_1$ and $AN_2$ for the east branch of the four-wire circuit, and between antennæ $AN_3$ and $AN_4$ for the west branch of the four-wire circuit. Antennæ $AN_1$ and $AN_3$ in the practical embodiment assumed are located at or near Rocky Point, Long Island and antennæ $AN_2$ and $AN_4$ are located at London, England. The circuits at the east station connecting the antennæ with the low frequency line comprise, in the receiving portion, the receiving circuit $RC_1$ and amplifier $AM_1$, the corresponding circuits for the transmitting portion comprising transmitter $T_1$ and amplifier $AM_2$. These transmitting and receiving portions of the circuit are joined to the low frequency line $L_2$ by means of a bridge transformer $H_1$ which cooperates with line $L_2$ and with balancing network $N_1$ in a well-known manner to insure conjugacy between the transmitting and receiving portions. The amplifiers $AM_1$ and $AM_2$ may be used or not as desired; expediency will justify their use in the usual practical case. The transmitter $T_1$ and receiver $RC_1$ embody combinations of conventional elements for respectively generating and transmitting a signal modulated high frequency wave and for demodulating an incoming signal modulated high frequency wave to reproduce the signal. The antennæ $AN_2$ and $AN_4$ are geographically or geometrically related to each other in such manner that local singing at that station is prevented. This effect may be aided by the use of different frequencies for the two directions of transmission and the frequency selection at the antennæ made possible thereby.

The circuits at the west station between the antennæ $AN_1$ and $AN_3$ and the low frequency line $L_1$ comprise a low frequency transmission path of several miles in length. The transmitting and receiving portions of this path are conjugately related to low frequency line $L_1$ by the hybrid coil arrangement $H_2$ and balancing network $N_2$, which function in the same manner as the similar elements at the east station. Transmitter $T_2$ and receiver $RC_2$ are similar to, and function in the identical manner as the respective devices $T_1$ and $RC_1$. The low frequency transmission circuit at this station comprises the amplifiers $AM_3$ and $AM_4$ and the delay circuit D. This delay circuit may be of the mechanical type illustrated in Figs. 1 or 2. The criteria for the efficient accomplishment of this function will be described later. The transmission circuit for receiving at this station may similarly comprise the amplifiers $AM_5$ and $AM_6$. Antennæ $AN_1$ and $AN_3$ are so related to each other, by any of the means referred to in the description of the east station circuits, as to prevent singing at the west station. For example, one or both of these antennæ may be made directive in such a direction as to exclude reaction on or from the other antenna. As a practical matter it will also be found expedient to position these antennæ a mile or more apart. Amplifiers $AM_4$ and $AM_6$ may conveniently be located at their respective antennæ. Amplifiers $AM_3$ and $AM_5$ may together constitute a four-wire repeating station located intermediate the antennæ and the low frequency line $L_1$.

The provision against local singing at the two stations insures that the system as a whole functions as a unitary four-wire line and radio circuit.

The west branch of the four-wire circuit is normally operative but is made inoperative by actuation of the switch 1 by relay $R_1$. The east branch of the four-wire circuit is normally inoperative by reason of the short circuit provided by switch 2 which may be actuated to open circuit position by relay $R_2$. For efficient operation of such a four-wire circuit it is desirable that only that branch be operative for transmission which is being employed at the moment. This insures that the "round-trip" path for singing or echo currents is at all times interrupted. The means for actuating the switches 1 and 2 so as to satisfy this requirement will now be described.

During transmission east, signal currents flow through amplifiers $AM_3$ and $AM_4$ and thence through delay circuit D to the radio transmitter. A relay control circuit 3 is derived from this branch at the input of the delay circuit. Signal currents flowing through this control circuit are amplified and rectified by device AMR and the resultant currents flow through and actuate relays $R_1$ and $R_2$. Relay $R_1$ actuates switch 1 to circuit closing position and accordingly renders the west branch inoperative. Relay $R_2$ actuates switch 2 to open circuit position and accordingly renders the east branch operative.

The delay circuit D insures that the actuation of switch 1 will have been completed before echo currents transmitted to and returned from the east station have progressed to the points of connection of the circuit containing switch 1. This delay circuit also insures that the switch 2 will have been actuated to render the east branch operative before the initial signal impulses reach the output of the delay circuit, so that "clipping" is prevented. Since it required less time to open switch 2 than it does to close switch 1, the design of a delay circuit to satisfy the first condition would ordinarily be effective for satisfying the second condition. This obviously would not be true if the west branch were made inoperative by a circuit opening operation, as would be possible by a simple rearrangement of the circuits. However, it has been found expedient in a practical case to use the circuit closing alternative disclosed. The amplifier-rectifier AMR may comprise any means for operating on the signal currents to obtain a wave which can efficiently operate relays $R_1$ and $R_2$. In a practical case it would comprise a combination of amplifier and rectifier elements, preferably of the vacuum tube type. An example of an arrangement well adapted for the purpose is disclosed in an application of Hartley, Serial No. 602,273, filed November 20, 1922. The switches 1 and 2 are biased, by means not shown, so as to return respectively to their open and closed positions when not actuated by the relays $R_1$ and $R_2$.

During west transmission the detected signal currents will find an uninterrupted path to the low frequency line $L_1$. Since the east branch is normally inoperative, the currents which pass through the hybrid coil $H_2$ cannot result in singing or echo phenomena in the four-wire circuit as a whole. However, in order to insure that such currents cannot enter control circuit 3, which would reorganize the circuits for eastward transmission and accordingly produce a periodical vibration of the switches 1 and 2 with an attendant interruption of the received signals and a tendency to singing and echo phenomena, a portion of the received signal currents interrupts this relay control circuit by opening the switch 4. This is accomplished by relay $R_3$ in relay control circuit 5. Amplifier rectifier $AMR_1$ in this circuit has the same function as that of AMR in circuit 3. The delay in transmission over the land line from the output of amplifier $AM_6$ to the output of amplifier $AM_4$ insures that switch 4 will be opened before these currents reach the output of amplifier $AM_4$.

What is claimed is:

1. In a wave transmission system which requires for its proper functioning a delay in the transmission of waves at a point in the system, large compared with the period of the waves, delay means comprising a mechanical line, the mass and elastic properties of which, together with the length of the line, are proportioned to give the desired delay, said line comprising a homogeneous medium having the mass and elastic properties continuously distributed along a substantial portion of its length.

2. Wave delaying means of the type and for the purpose described in claim 1, in which the mechanical line comprises a gaseous medium enclosed in a sound conduit.

3. In an electrical wave transmission system which requires for its proper functioning a time delay in the wave transmission at a point in the system, said required delay being large compared with the period of the transmitted waves, delay means comprising an enclosed air column, the mass and elastic properties of which, together with the length, are proportioned to give the desired delay, and electro-mechanical coupling means for connecting said air column between two portions of the electrical system.

4. Wave delaying means of the type and for the purpose described in claim 3, in which the electromechanical coupling means comprises a telephone receiving instrument at one end of the column and a telephone transmitter at the other end.

In witness whereof, I hereunto subscribe my name this 14th day of December, A. D. 1926.

ROBERT C. MATHES.